(12) United States Patent
Carr

(10) Patent No.: US 10,844,807 B2
(45) Date of Patent: Nov. 24, 2020

(54) SYSTEM INCLUDING HIDDEN DRAG LINK ASSEMBLY FOR ACTUATING BLOCKER DOOR OF THRUST REVERSER

(71) Applicant: SPIRIT AEROSYSTEMS, INC., Wichita, KS (US)

(72) Inventor: Alexander Jon Carr, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 233 days.

(21) Appl. No.: 16/019,830

(22) Filed: Jun. 27, 2018

(65) Prior Publication Data
US 2020/0003154 A1  Jan. 2, 2020

(51) Int. Cl.
*F02K 1/76* (2006.01)
*F02K 1/72* (2006.01)

(52) U.S. Cl.
CPC ............... *F02K 1/763* (2013.01); *F02K 1/72* (2013.01); *F02K 1/766* (2013.01); *F05D 2260/50* (2013.01)

(58) Field of Classification Search
CPC . F02K 1/763; F02K 1/72; F02K 1/766; F05D 2260/50
See application file for complete search history.

(56) References Cited

U.S. PATENT DOCUMENTS

| | | | | |
|---|---|---|---|---|
| 3,608,314 | A | * | 9/1971 | Colley ............... F02K 1/72 60/226.2 |
| 4,278,220 | A | * | 7/1981 | Johnston ............ F02K 1/72 244/110 B |
| 2003/0218094 | A1 | * | 11/2003 | Lair ................ B64D 33/04 244/110 B |
| 2013/0284822 | A1 | * | 10/2013 | Howarth ............ F02K 3/06 239/11 |
| 2016/0245228 | A1 | * | 8/2016 | Gormley ............ F02K 1/72 |
| 2017/0175674 | A1 | * | 6/2017 | Schrell ............. F02K 1/763 |
| 2017/0292474 | A1 | * | 10/2017 | Davies ............. F02K 1/625 |
| 2018/0038313 | A1 | * | 2/2018 | Wawrzynek ........ F02K 1/72 |
| 2019/0032600 | A1 | * | 1/2019 | Beasman ........... F02K 1/54 |
| 2019/0048824 | A1 | * | 2/2019 | Calder ............. F02K 1/763 |

\* cited by examiner

*Primary Examiner* — Carlos A Rivera
(74) *Attorney, Agent, or Firm* — Hovey Williams LLP

(57) ABSTRACT

A system for actuating a blocker door of a thrust reverser, in which a drag link assembly is removed from the airflow through the engine during flight. The assembly couples the door to a sleeve so that translation of the sleeve between deployed and stowed positions moves the door to open and closed positions, respectively. The assembly includes a drag link track having a channel extending between first and second track ends, and a drag link having a link end which is slidable in the track channel between the first and second track ends. During deployment, translation of the sleeve causes the second link end to slide within the channel toward the second track end which causes the door to open, and during stowage, translation of the sleeve causes the second link end to slide within the channel toward the first track end which causes the door to close.

17 Claims, 20 Drawing Sheets

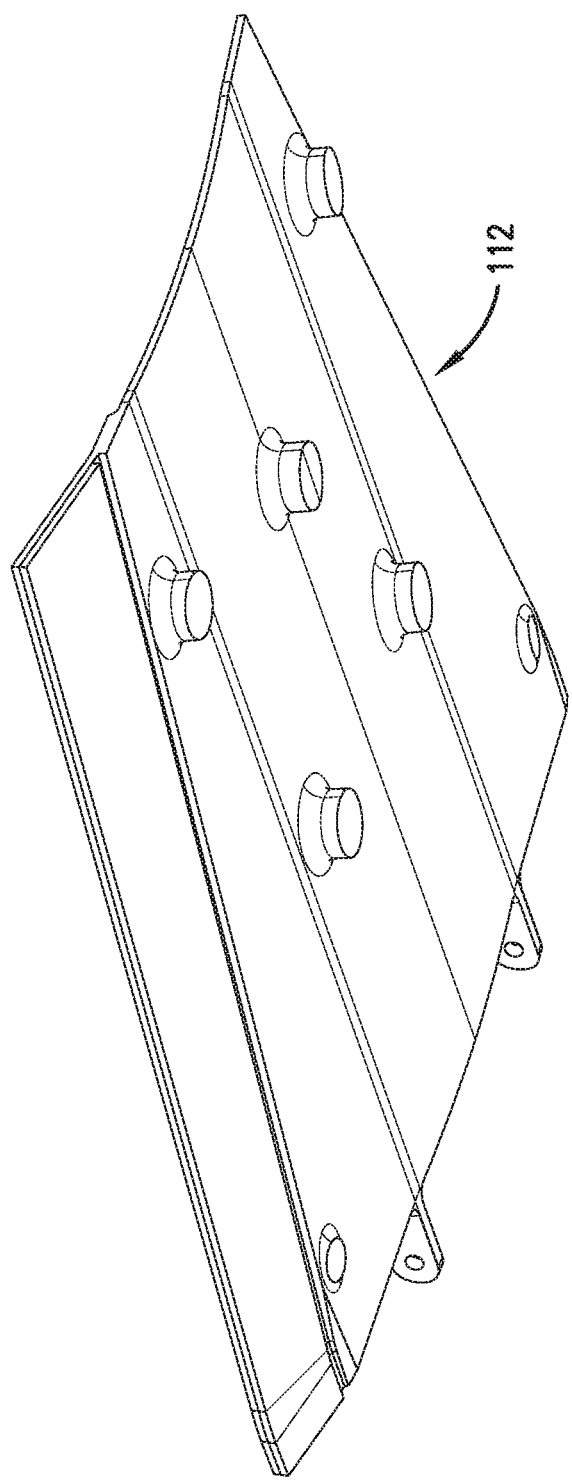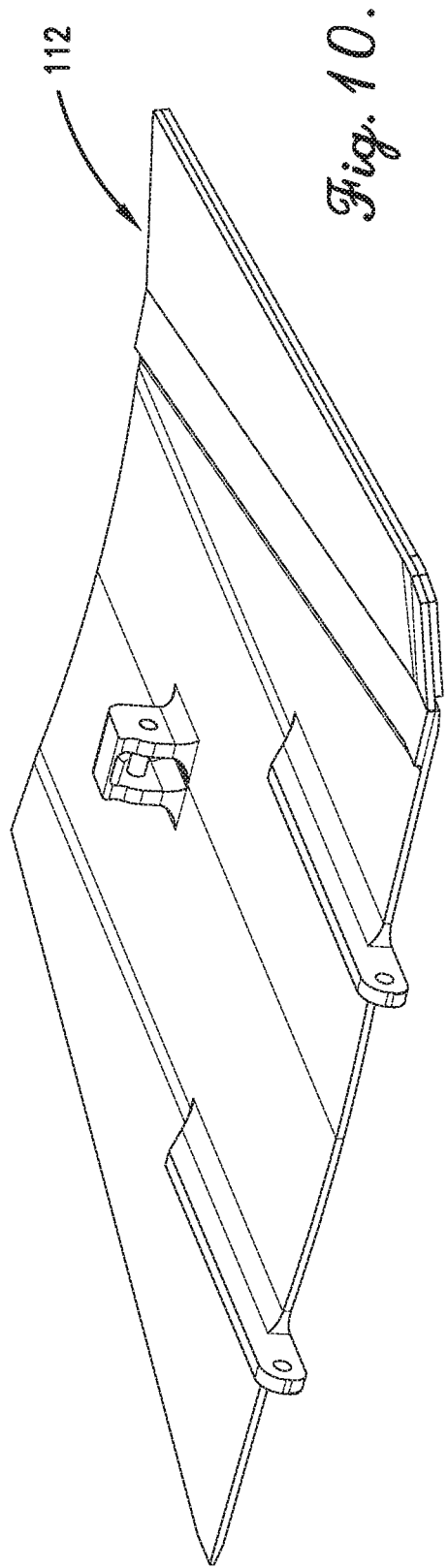

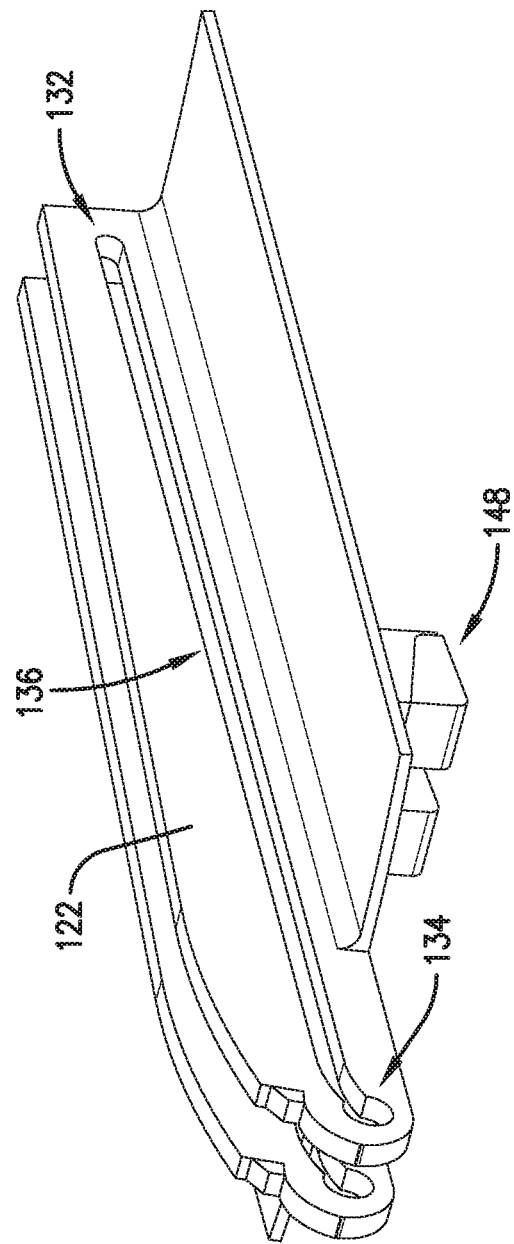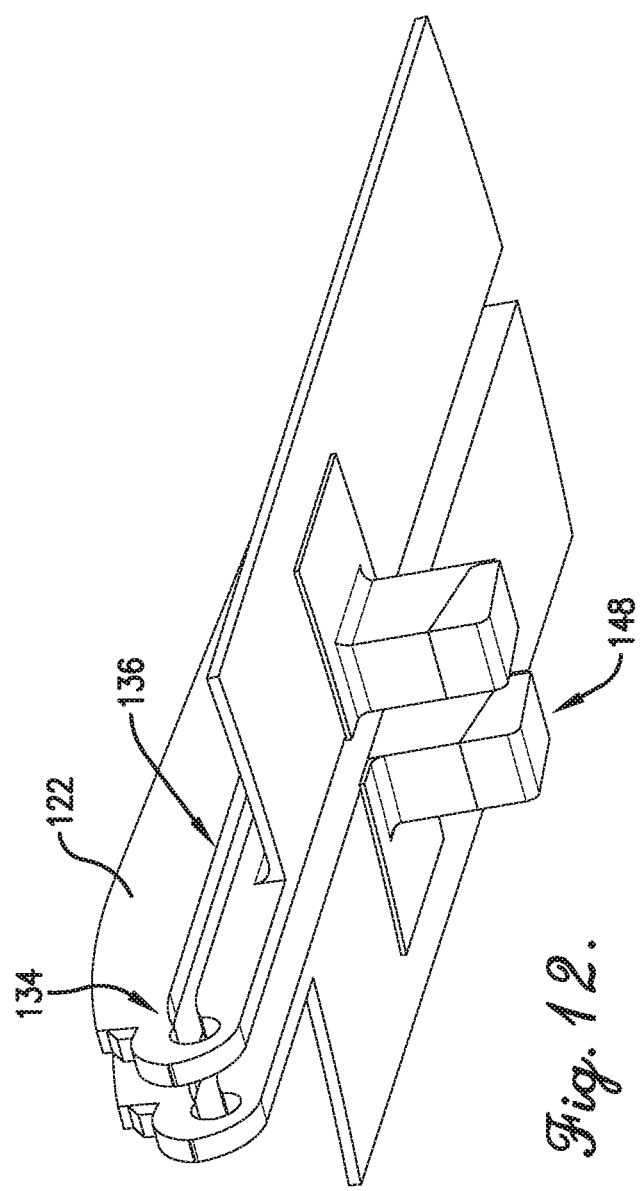

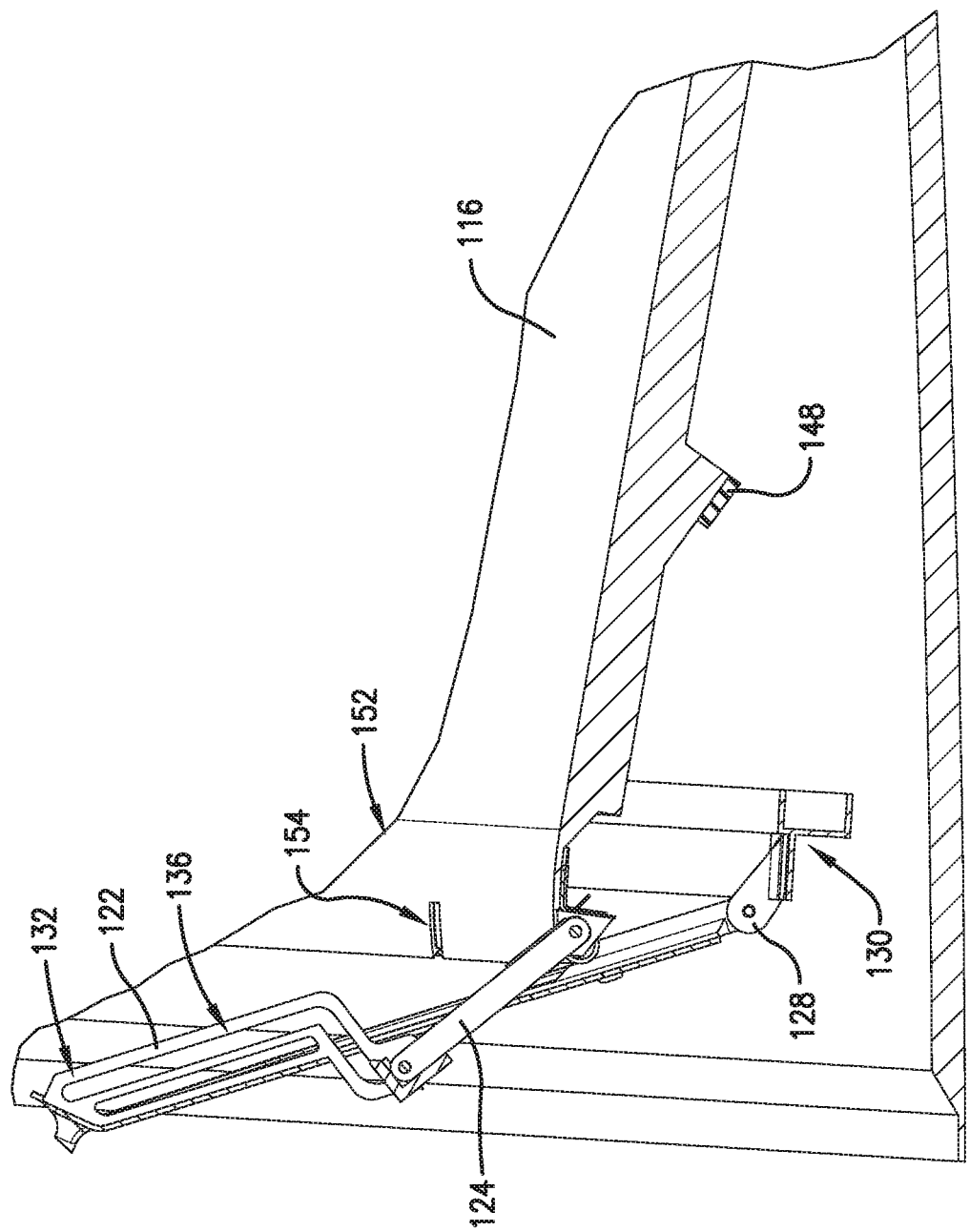

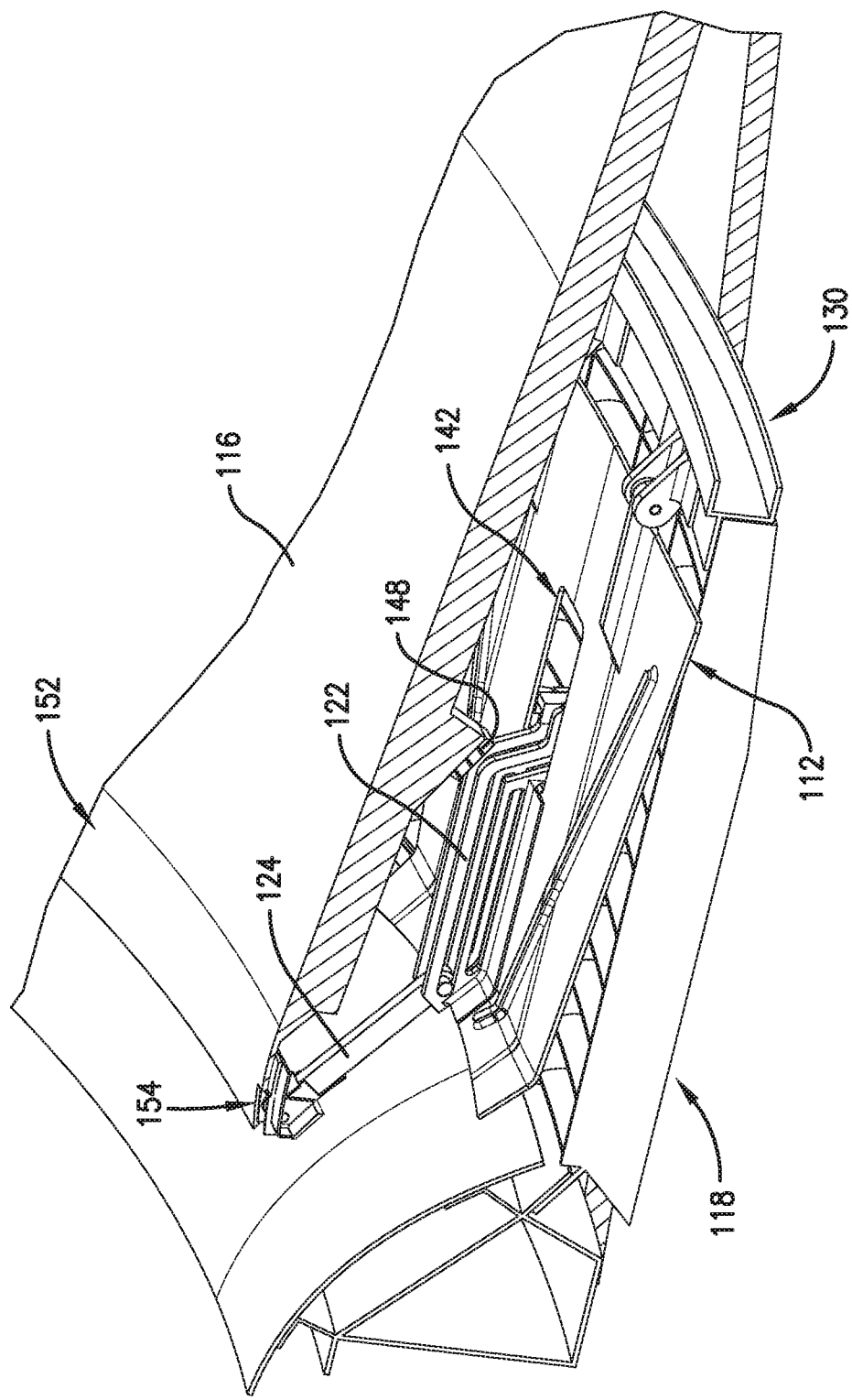

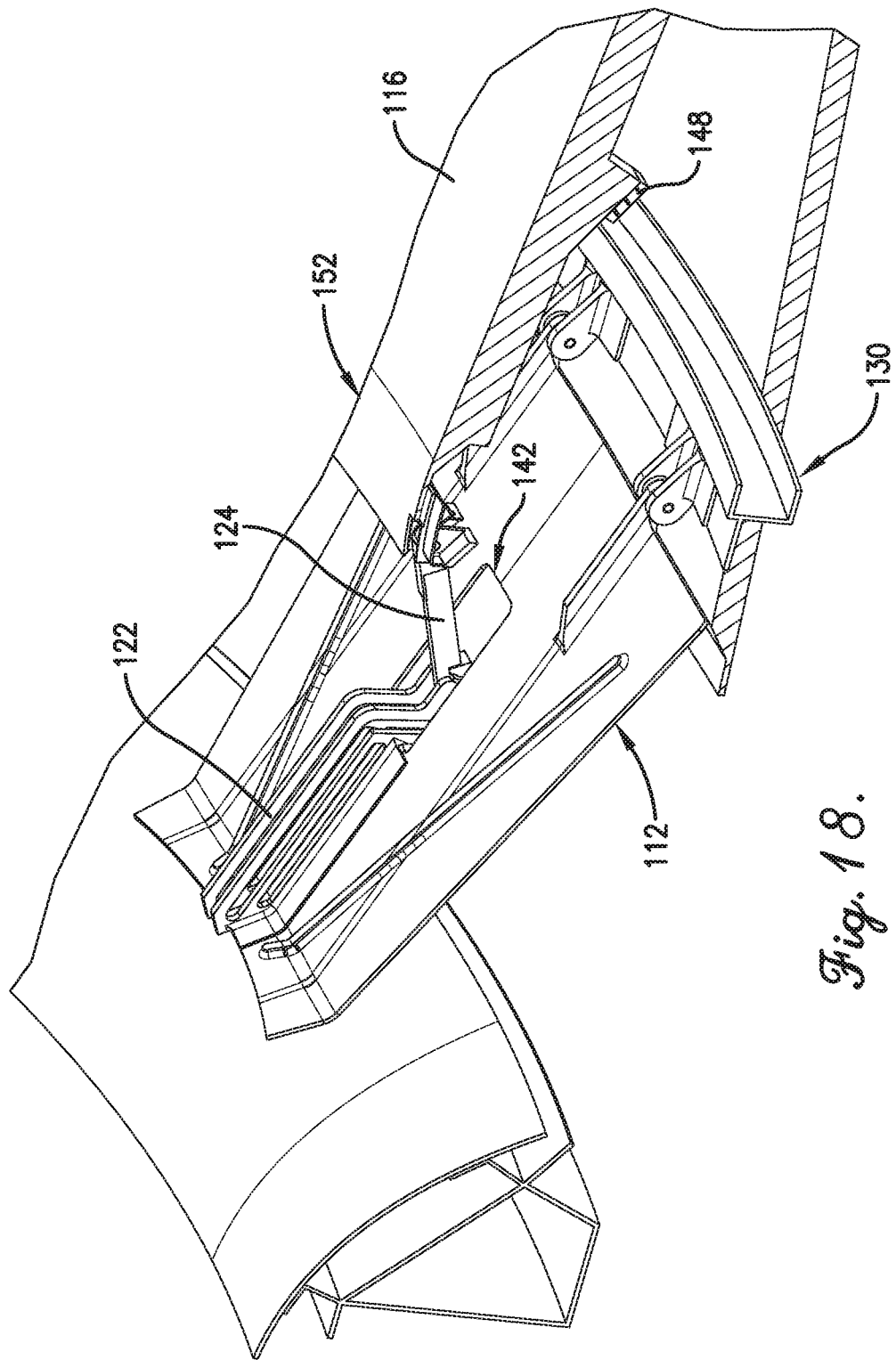

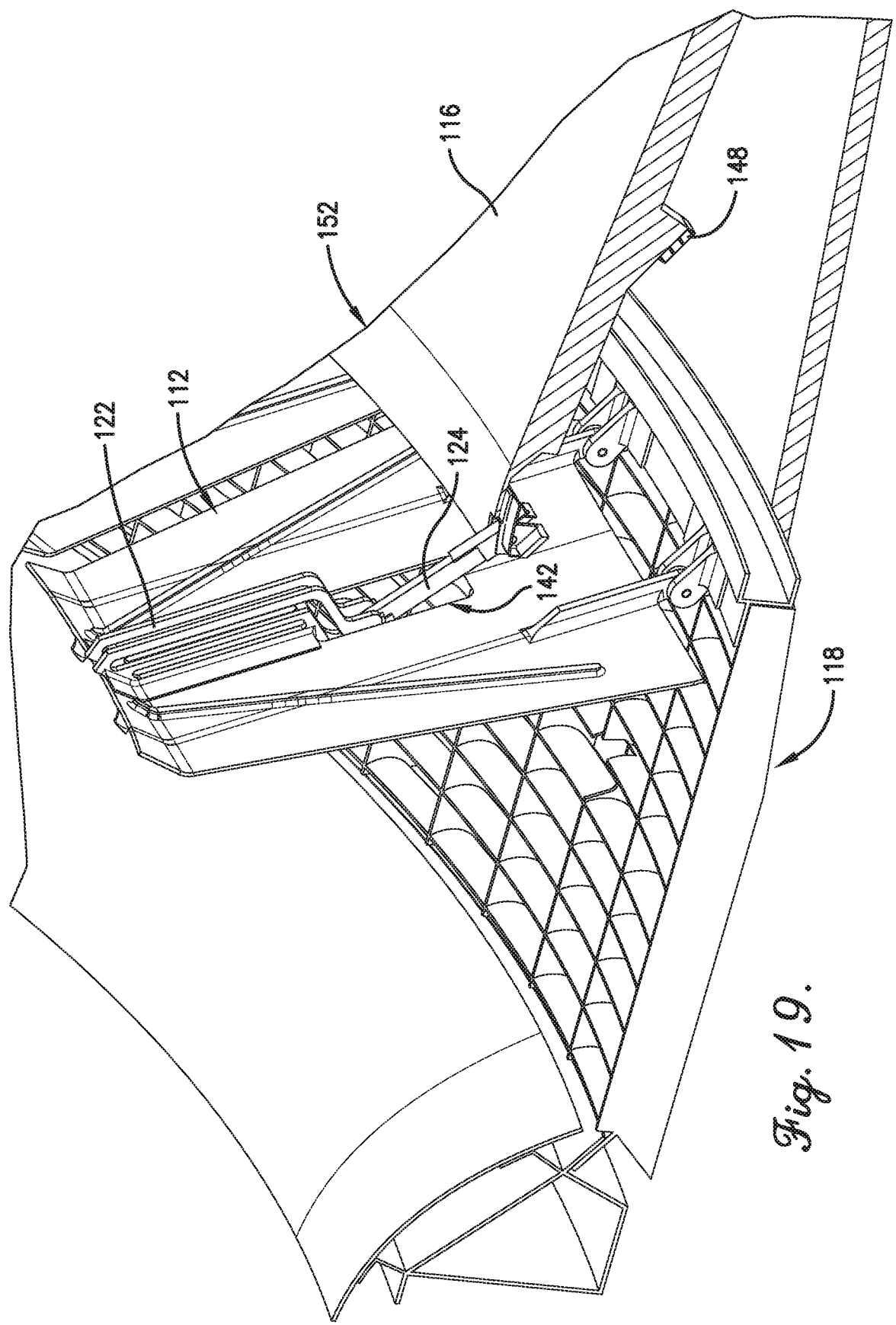

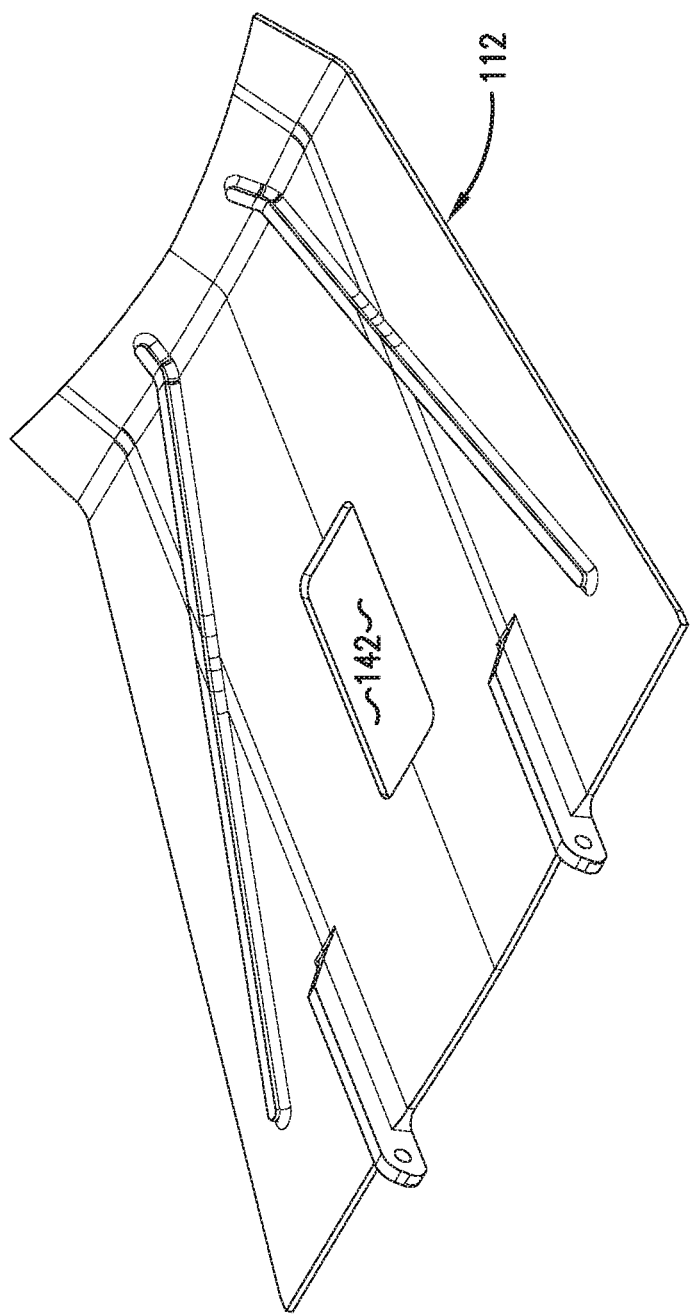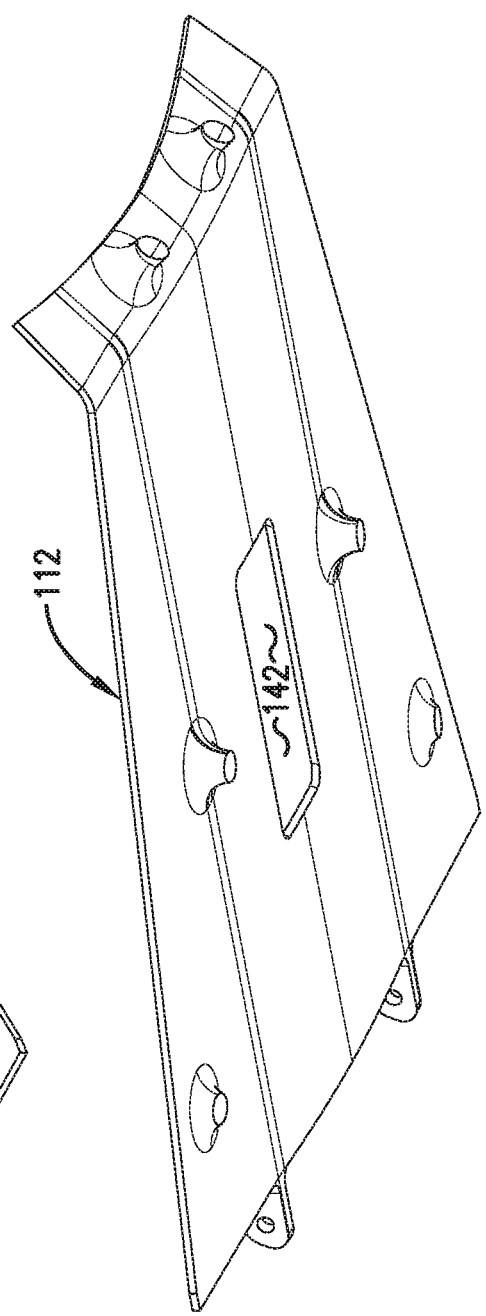

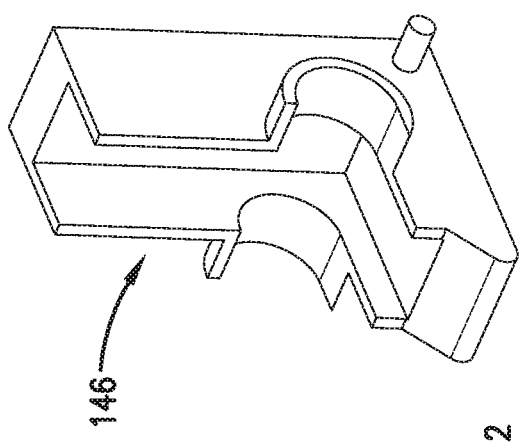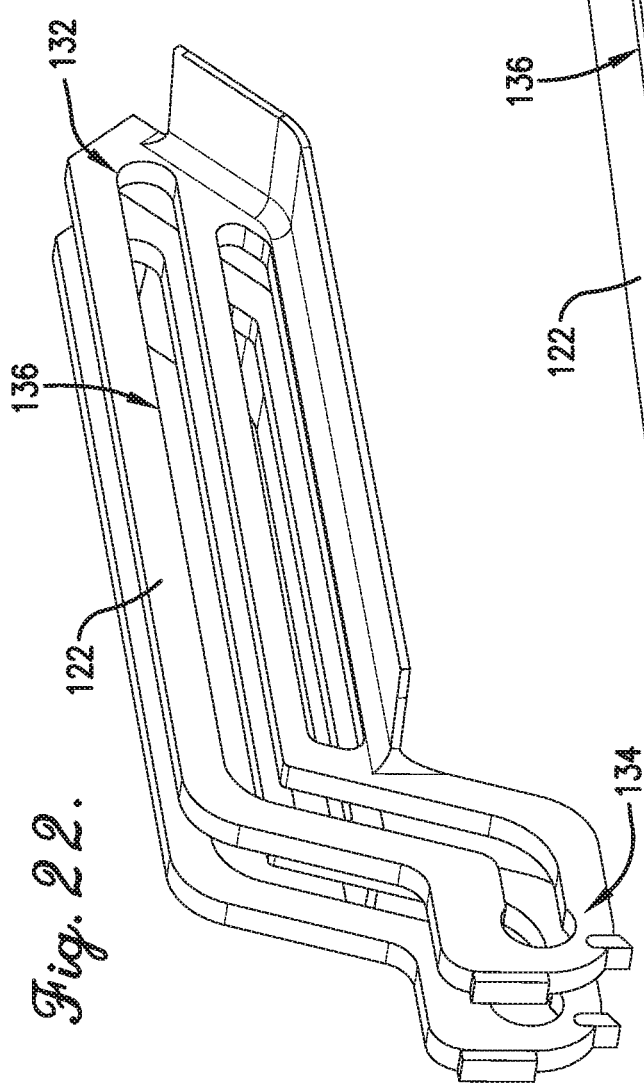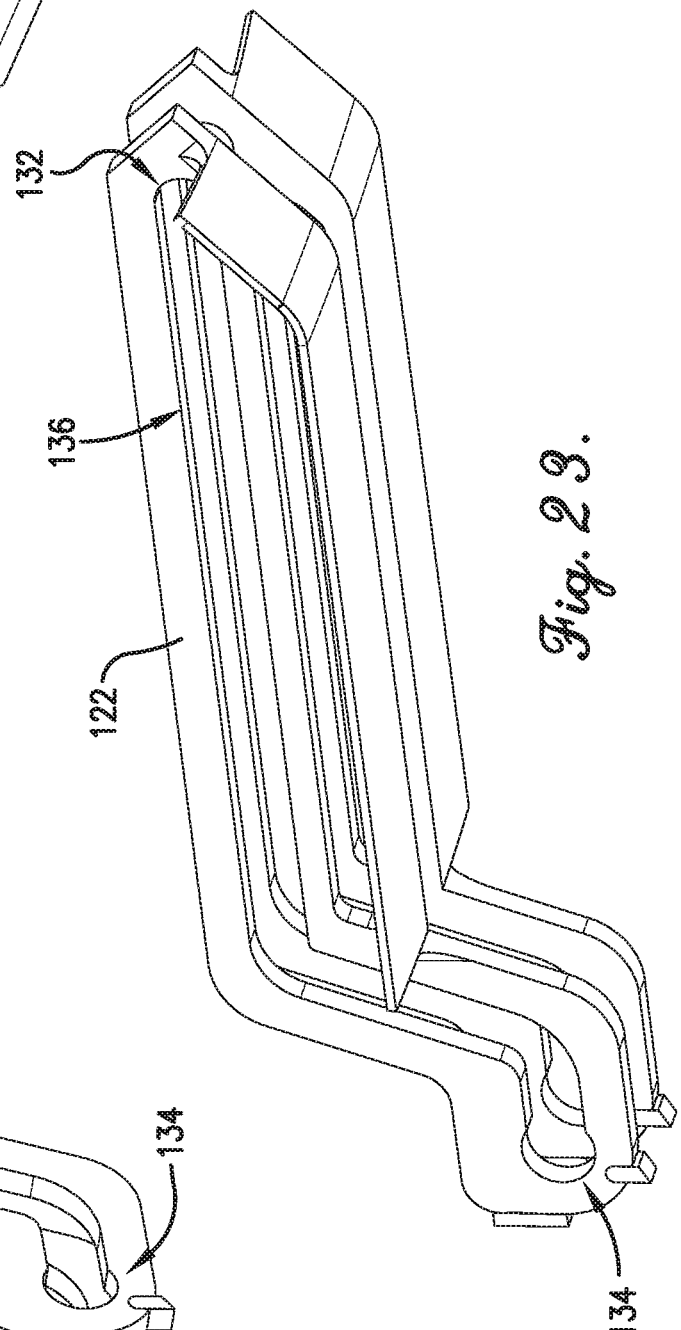

SYSTEM INCLUDING HIDDEN DRAG LINK ASSEMBLY FOR ACTUATING BLOCKER DOOR OF THRUST REVERSER

FIELD

The present invention relates to thrust reversers for aircraft engines, and more particularly, embodiments concern a system including a hidden drag link assembly for actuating a blocker door of a translating sleeve thrust reverser, wherein the hidden drag link assembly stows within a space between the sleeve and the blocker door so as to be removed from the airflow through the engine and thereby reduce drag during flight.

BACKGROUND

Translating sleeve thrust reversers incorporate cascade assemblies which include pluralities of cascade segments, or baskets, spaced circumferentially around the engine nacelles. Each cascade segment includes a plurality of spaced airflow-turning vanes defining a series of cells or air passages. As seen in FIG. 1 (PRIOR ART), when the thrust reverser 40 is in a stowed configuration, the cascade segments 42 are covered and air flows through and rearwardly out of the engine to provide forward thrust. As seen in FIG. 2 (PRIOR ART), when the thrust reverser 40 is in a deployed configuration, the cascade segments 42 are uncovered and at least a portion of the air flowing through the engine is redirected through and forwardly by the vanes of the cascade segments 42 to provide reverse thrust.

Blocker doors 44 are used to redirect the airflow through the cascade segments 42. A drag link 46 actuates each blocker door 44 between closed and open positions which respectively correspond to the stowed and deployed configurations of the thrust reverser 40. In operation, an actuator mounted to a torque box translates a sleeve 48 rearward, and hinges mounted to the sleeve 48 pull the blocker door 44 rearward. The drag link 46 rotates around a pivot point and pulls the blocker door 44 upward, and the blocker door 44 rotates on the hinges to the open position. A control link allows limited relative motion and maintains tension in the stowed configuration.

However, the drag link 46 for actuating the blocker door 44 is exposed to the airflow through the engine during all phases of flight, regardless of the stowed or deployed configuration of the thrust reverser 40, which results in undesired drag. In one prior art solution, a track is provided for the drag link, but this does not allow for adequate control of the airflow during transition. One challenge is to open the blocker door sufficiently early in the deployment of the thrust reverser to avoid increasing the total airflow area too quickly and potentially causing damage to the engine. Other prior art solutions include complex actuation mechanisms and/or multiple linkages that interact to provide better potential transient control, but these suffer from increased complexity. One way to altogether avoid these problems is to replace the translating sleeve with pivot doors, but the latter typically provides less reverser efficiency than the former.

This background discussion is intended to provide information related to the present invention which is not necessarily prior art.

SUMMARY

Embodiments address the above-described and other problems and limitations by providing a system including a hidden drag link assembly for actuating a blocker door of a translating sleeve thrust reverser, wherein the hidden drag link assembly stows within a space between the sleeve and the blocker door so as to be removed from the airflow through the engine and thereby reduce drag during flight.

In one embodiment, a system is provided for actuating a blocker door of a thrust reverser. Broadly, the system may include a sleeve, a blocker door, and a drag link assembly. The sleeve may be translatable between a stowed position in which an engine airflow is directed rearwardly and a deployed position in which the engine airflow is redirected forwardly. The blocker door may be moveable between a closed position associated with the stowed position of the sleeve in which the engine airflow is directed rearwardly and an open position associated with the deployed position of the sleeve in which the engine airflow is redirected laterally by the blocker door. The drag link assembly may be located between the sleeve and the blocker door and configured to mechanically couple the sleeve to the blocker door so that translation of the sleeve to the deployed position moves the blocker door to the open position and translation of the sleeve to the stowed position moves the blocker door to the closed position. The drag link assembly may include a drag link track having a first track end, a second track end, and an elongated channel extending between the first and second track ends, and a drag link having a first link end and a second link end, with the second link end being slidably received in the elongated channel of the drag link track and moveable within the elongated channel between the first track end and the second track end. During deployment of the translating sleeve thrust reverser, the sleeve may be translated aft to the deployed position, and the second link end may slide within the elongated channel toward the second track end which causes the blocker door to move to the open position. During stowage of the translating sleeve thrust reverser, the sleeve may be translated forward to the stowed position, and the second link end may slide within the elongated channel toward the first track end which causes the blocker door to move to the closed position in which the drag link assembly is not exposed to the engine airflow.

Various implementations of the above-described embodiment may include any one or more of the following additional or alternative features. The drag link track may be mounted to the sleeve such that the drag link track moves with the sleeve, and the drag link may be rotatably connected to the blocker door. Alternatively, the drag link track may be mounted to the blocker door, and the drag link may be rotatably connected to the sleeve such that the drag link moves with the sleeve. The elongated channel proximate to the second track end may be curved. The first and second track ends may be offset and connected by a laterally extending intermediate section of the elongated channel. At least one of the first and second link ends may include a friction-reducing element (e.g., a roller bearing or wheel).

The system may further include a locking element located at the second track end of the elongated channel of the drag link track and configured to engage and retain the second link end when the blocker door is in the open position. The system may further include a bumper element extending between the sleeve and the blocker door when the sleeve is in the stowed position and the blocker door is in the closed position. The bumper element may extend between at least one of the sleeve or the blocker door and the drag link assembly mounted to at least one of the sleeve or the blocker door. The system may further include a seal element provided on a leading edge of the sleeve and configured to seal a space in which the drag link assembly is located between the sleeve and the blocker door from the engine airflow when the sleeve is in the stowed position and the blocker door is in the closed position. The seal element may include a channel through which a portion of the drag link assembly passes when the sleeve is in the deployed position and the blocker door is in the open position.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 9 is an isometric view of a first side of the blocker door of FIG. 3;

FIG. 10 is an isometric view of a second side of the blocker door of FIG. 8;

FIG. 11 is an isometric view of a first side of a drag link track component of the drag link assembly of FIG. 3;

FIG. 12 is an isometric view of a second side of the drag link component of FIG. 10;

FIG. 13 is an isometric view of a locking mechanism of the system of FIG. 3;

FIG. 16 is a fragmentary cross-sectional side elevation view of the system of FIG. 14, wherein the sleeve is shown in the deployed position and the blocker door is shown in the open position;

FIG. 17 is a fragmentary cross-sectional isometric view of the system of FIG. 14, wherein the sleeve is shown in the stowed position and the blocker door is shown in the closed position;

FIG. 18 is a fragmentary cross-sectional isometric view of the system of FIG. 14, wherein the sleeve is shown in the intermediate position and the blocker door is shown in the intermediate position;

FIG. 19 is a fragmentary cross-sectional isometric view of the system of FIG. 14, wherein the sleeve is shown in the deployed position and the blocker door is shown in the open position;

FIG. 20 is an isometric view of the first side of the blocker door of FIG. 14;

FIG. 21 is an isometric view of the second side of the blocker door of FIG. 20;

FIG. 22 is an isometric view of the first side of the drag link track component of the drag link assembly of FIG. 14;

FIG. 23 is an isometric view of the second side of the drag link component of FIG. 22;

FIG. 24 is an isometric view of the locking mechanism of the system of FIG. 14;

Figure 1:
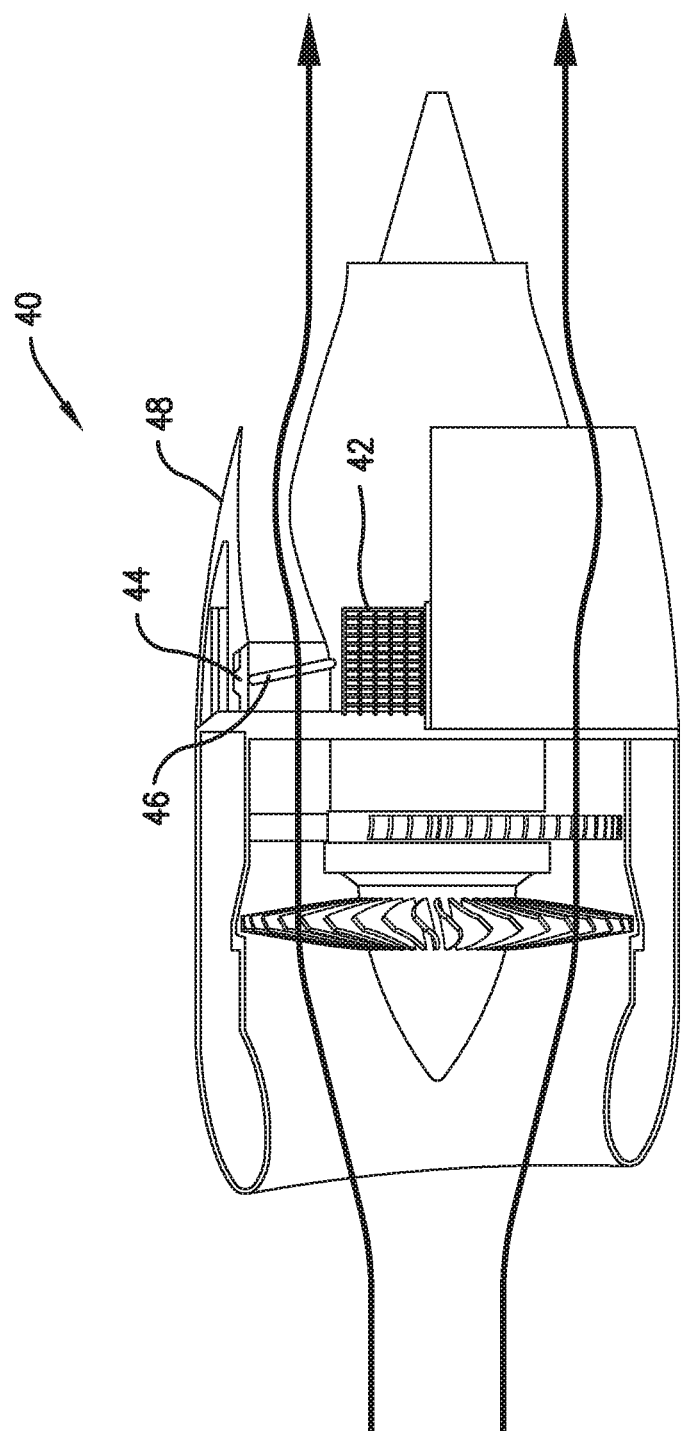
FIG. 1 (PRIOR ART) is a cross-sectional side elevation view of an aircraft engine having a translating sleeve thrust reverser in a stowed position, with an engine airflow directed rearwardly.
Figure 2:
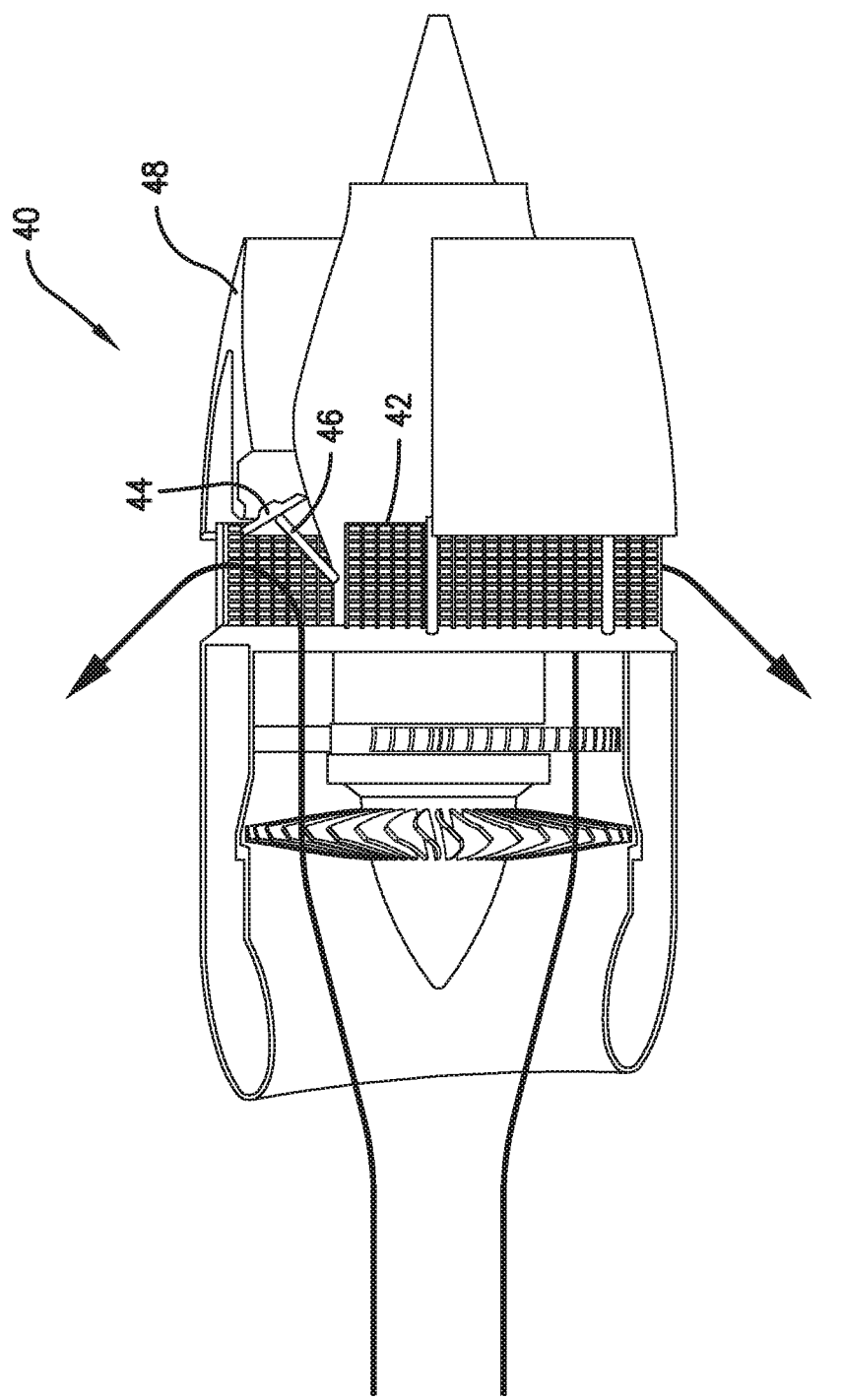
FIG. 2 (PRIOR ART) is a cross-sectional side elevation view of the aircraft engine of FIG. 1 (PRIOR ART) having the translating sleeve thrust reverser in a deployed position, with the engine airflow redirected forwardly.
Figure 3:
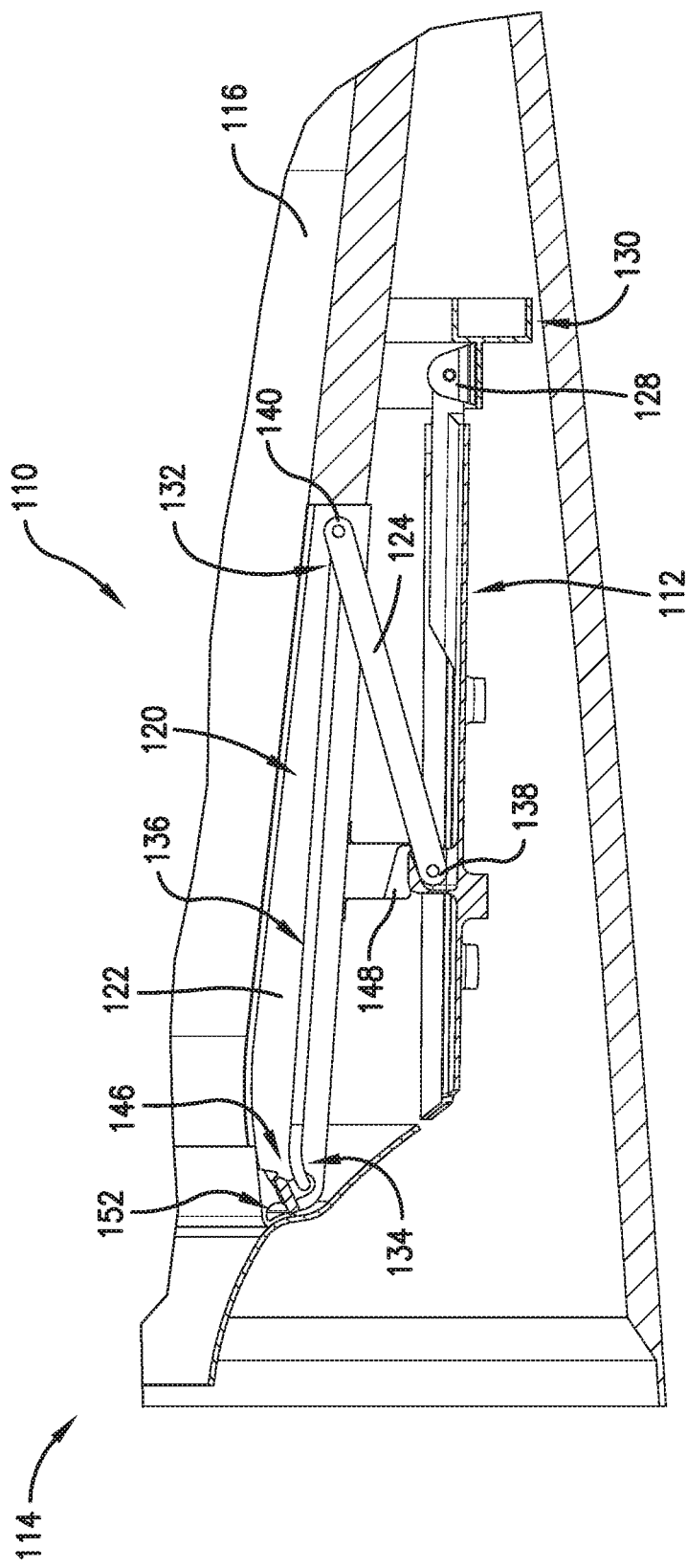
FIG. 3 is a fragmentary cross-sectional side elevation view of an embodiment of a system for actuating a blocker door of the translating sleeve thrust reverser, wherein the system includes a first implementation of a drag link assembly, and wherein a sleeve is shown in a stowed position and the blocker door is shown in a closed position.
Figure 4:
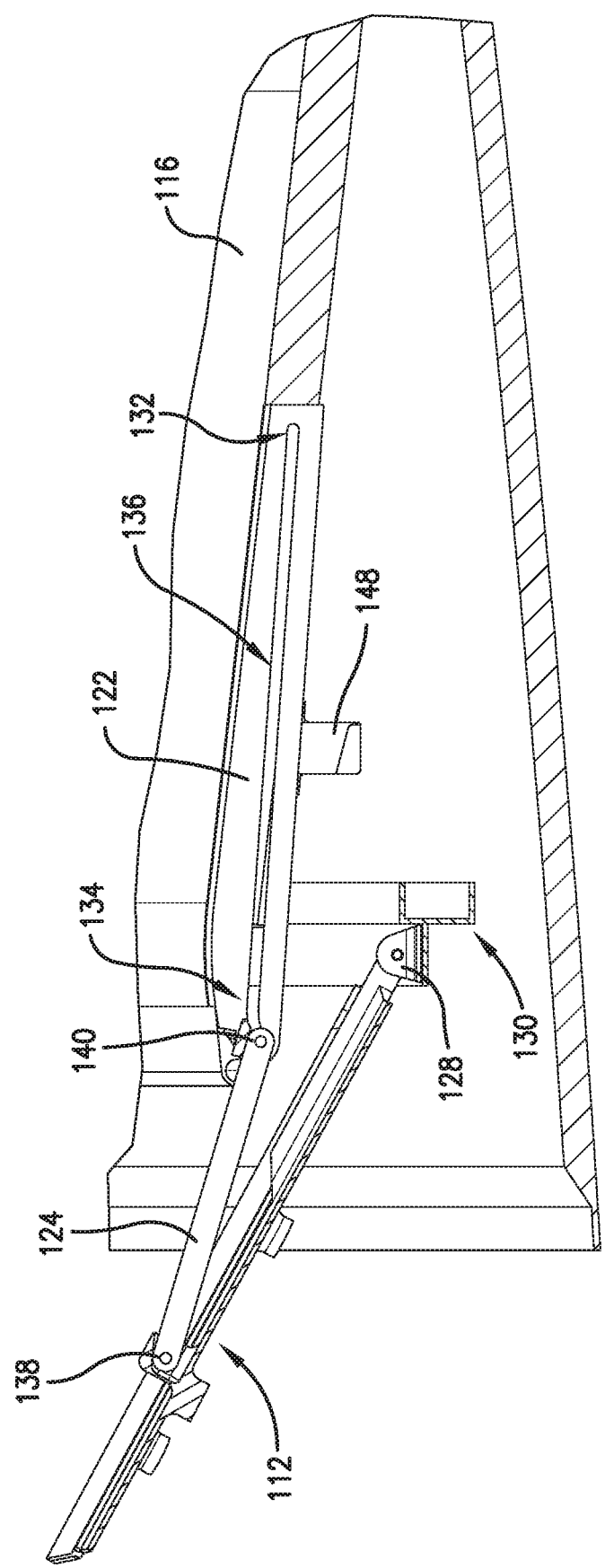
FIG. 4 is a fragmentary cross-sectional side elevation view of the system of FIG. 3, wherein the sleeve is shown in an intermediate position and the blocker door is shown in an intermediate position.
Figure 5:
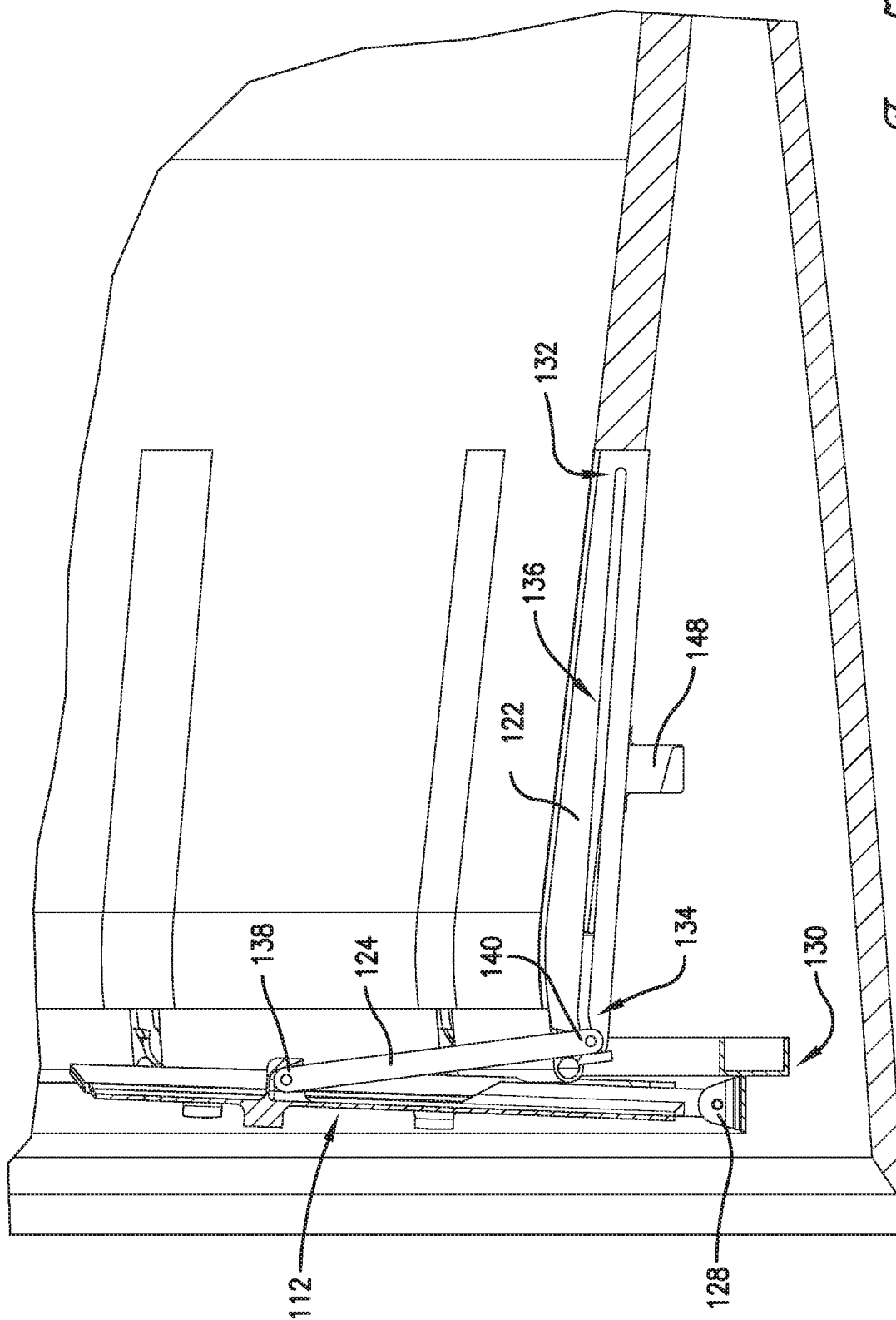
FIG. 5 is a fragmentary cross-sectional side elevation view of the system of FIG. 3, wherein the sleeve is shown in a deployed position and the blocker door is shown in an open position.
Figure 6:
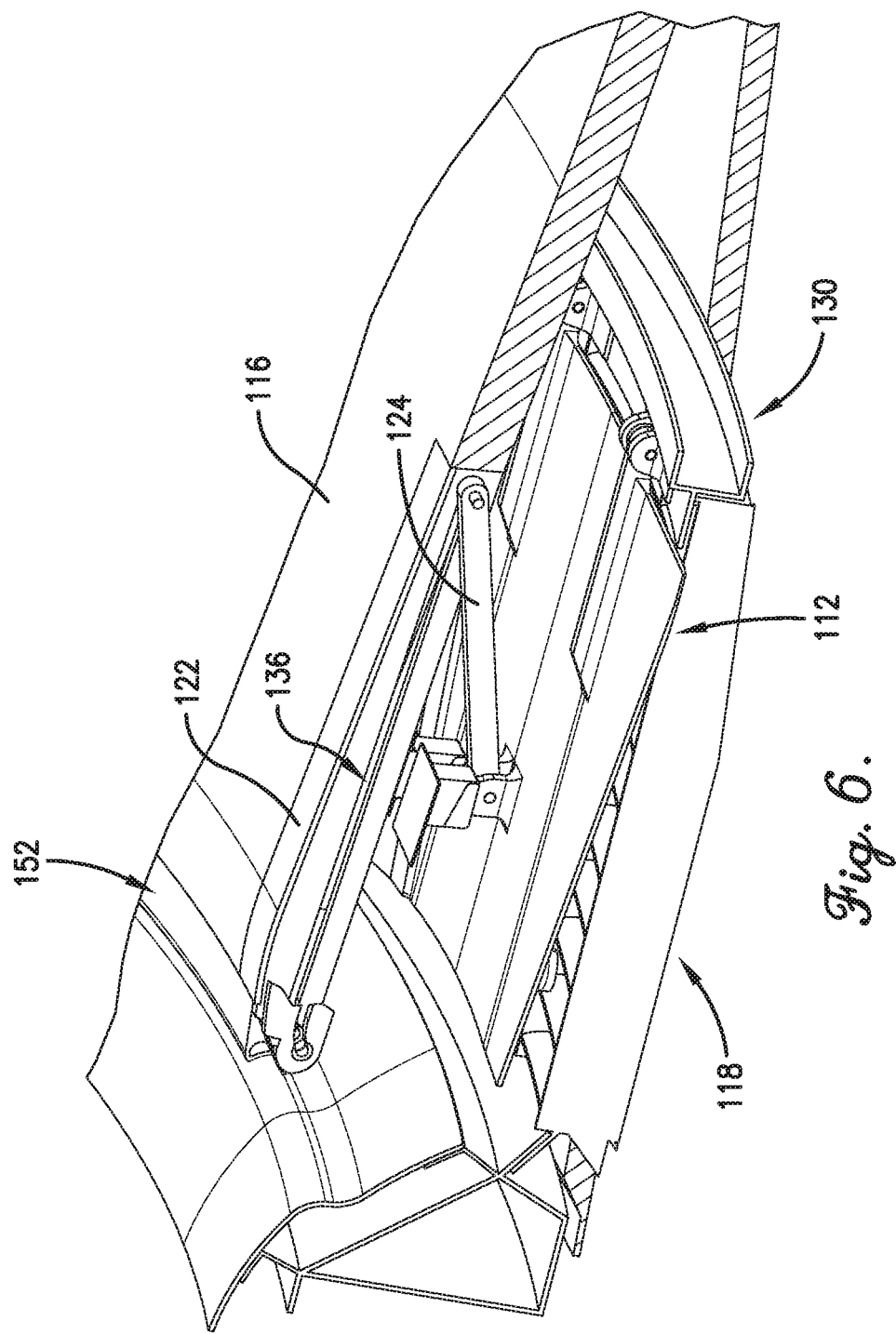
FIG. 6 is a fragmentary cross-sectional isometric view of the system of FIG. 3, wherein the sleeve is shown in the stowed position and the blocker door is shown in the closed position.
Figure 7:
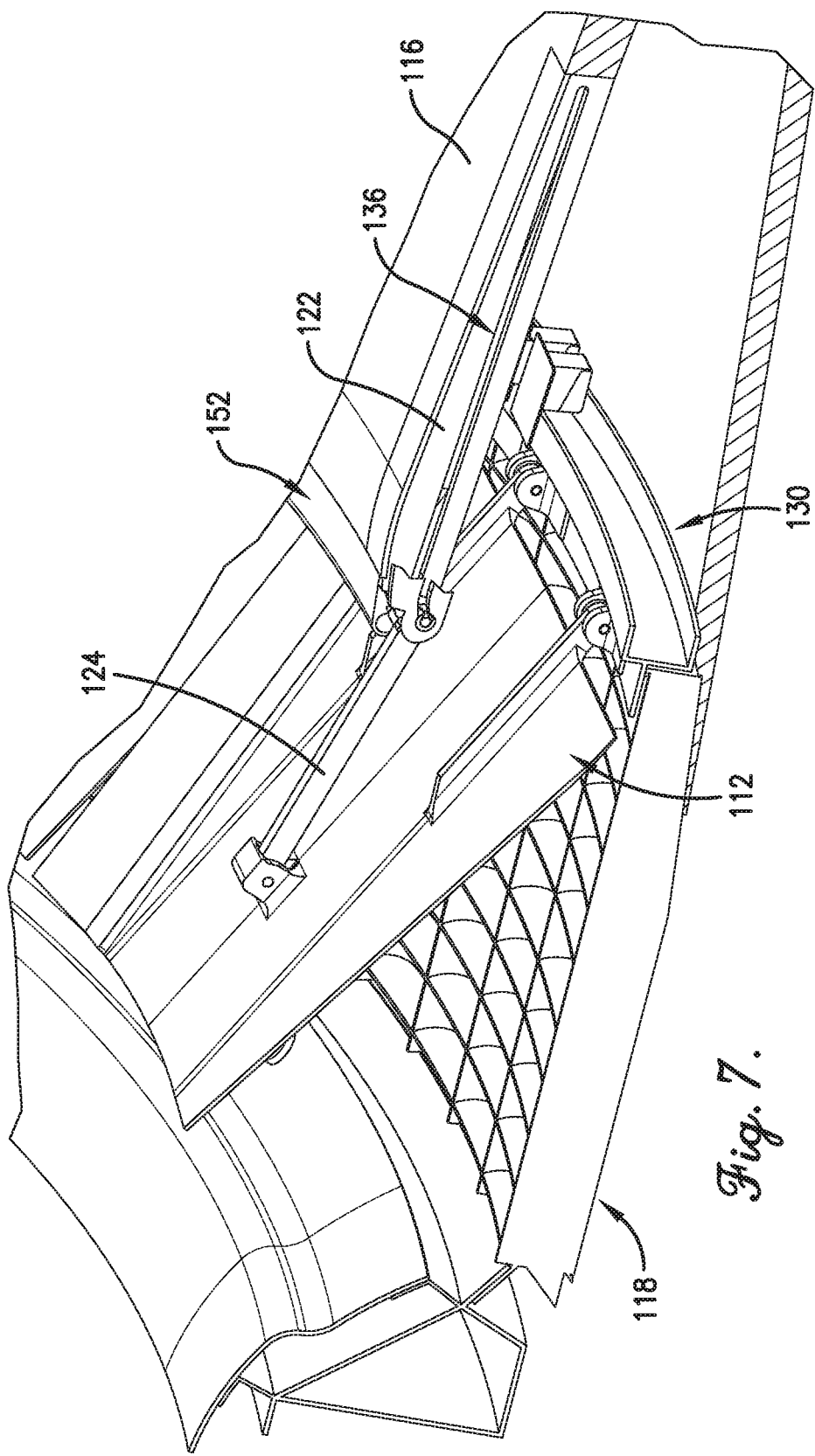
FIG. 7 is a fragmentary cross-sectional isometric view of the system of FIG. 3, wherein the sleeve is shown in the intermediate position and the blocker door is shown in the intermediate position.
Figure 8:
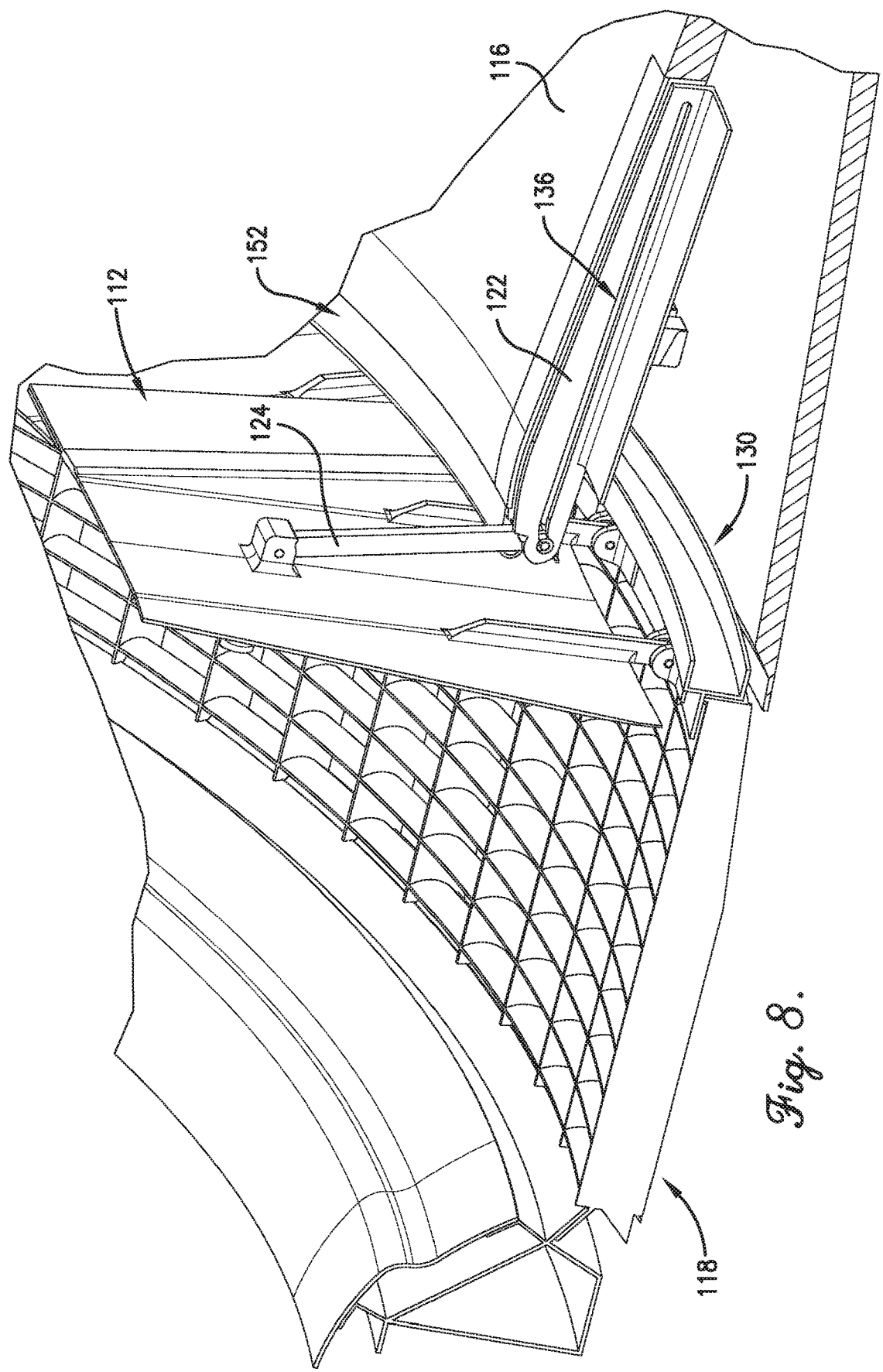
FIG. 8 is a fragmentary cross-sectional isometric view of the system of FIG. 3, wherein the sleeve is shown in the deployed position and the blocker door is shown in the open position.
Figure 14:
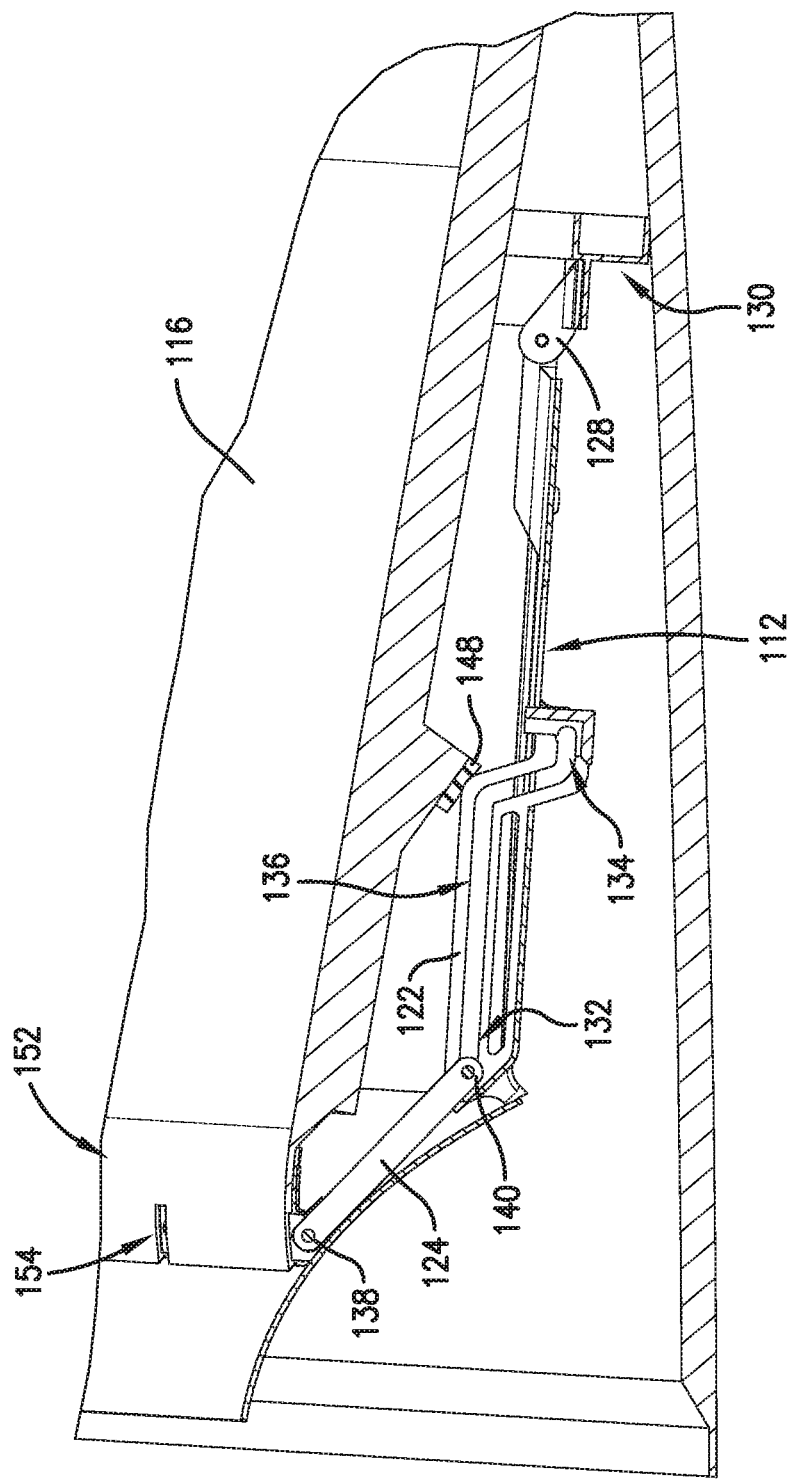
FIG. 14 is a fragmentary cross-sectional side elevation view of the embodiment of the system for actuating the blocker door of the translating sleeve thrust reverser, wherein the system includes a second implementation of the drag link assembly, and wherein the sleeve is shown in the stowed position and the blocker door is shown in the closed position.
Figure 15:
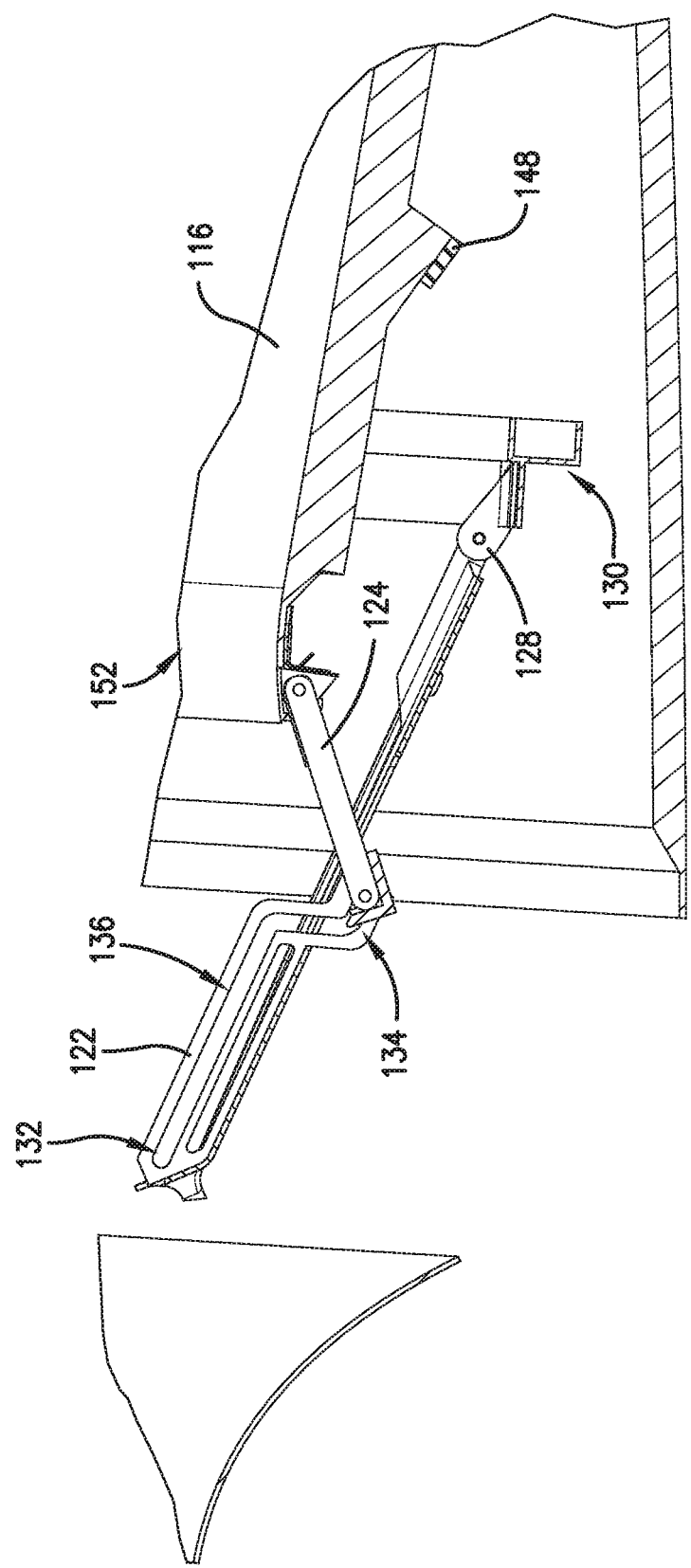
FIG. 15 is a fragmentary cross-sectional side elevation view of the system of FIG. 14, wherein the sleeve is shown in the intermediate position and the blocker door is shown in the intermediate position.
Figure 25:
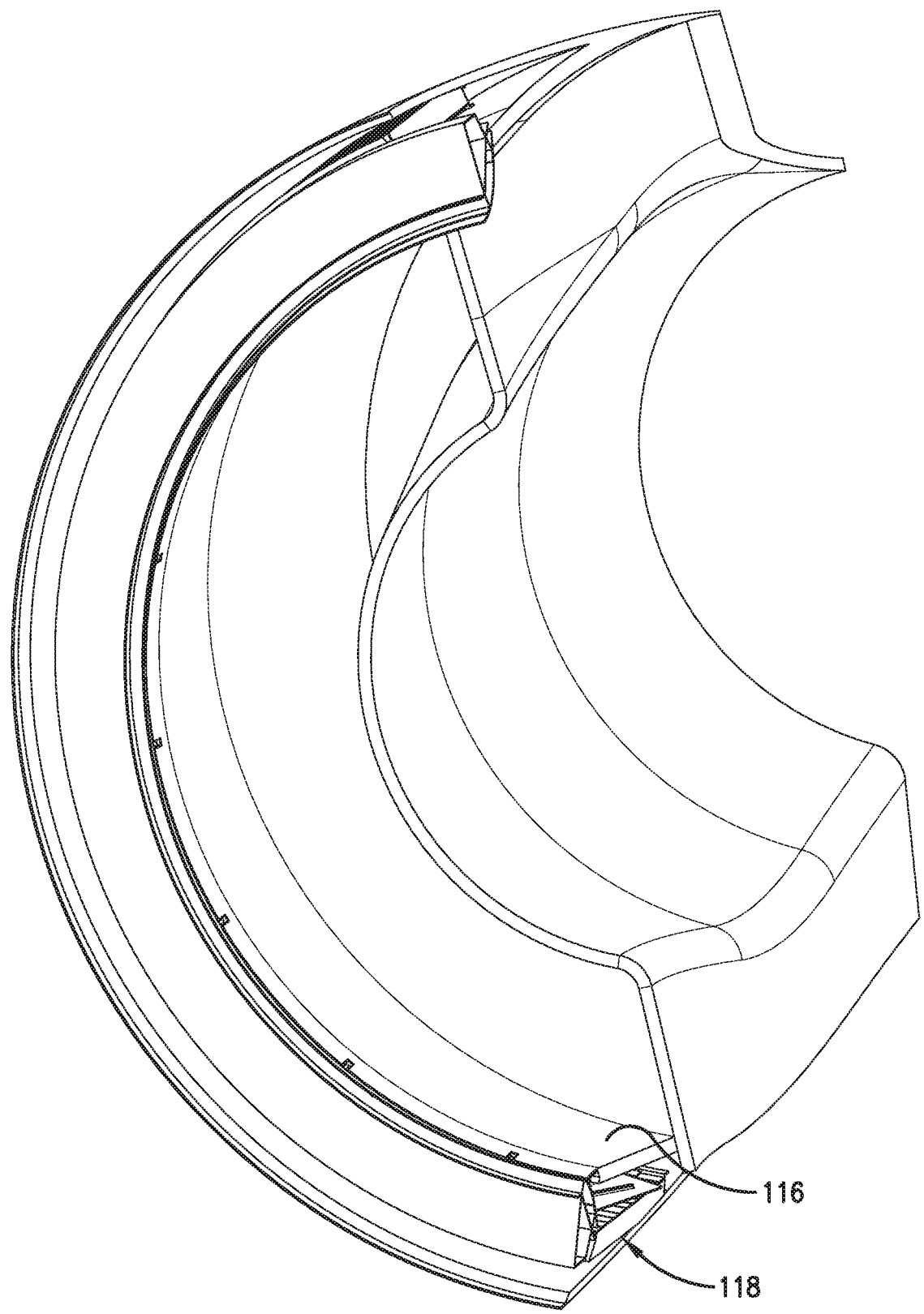
Figure 26:
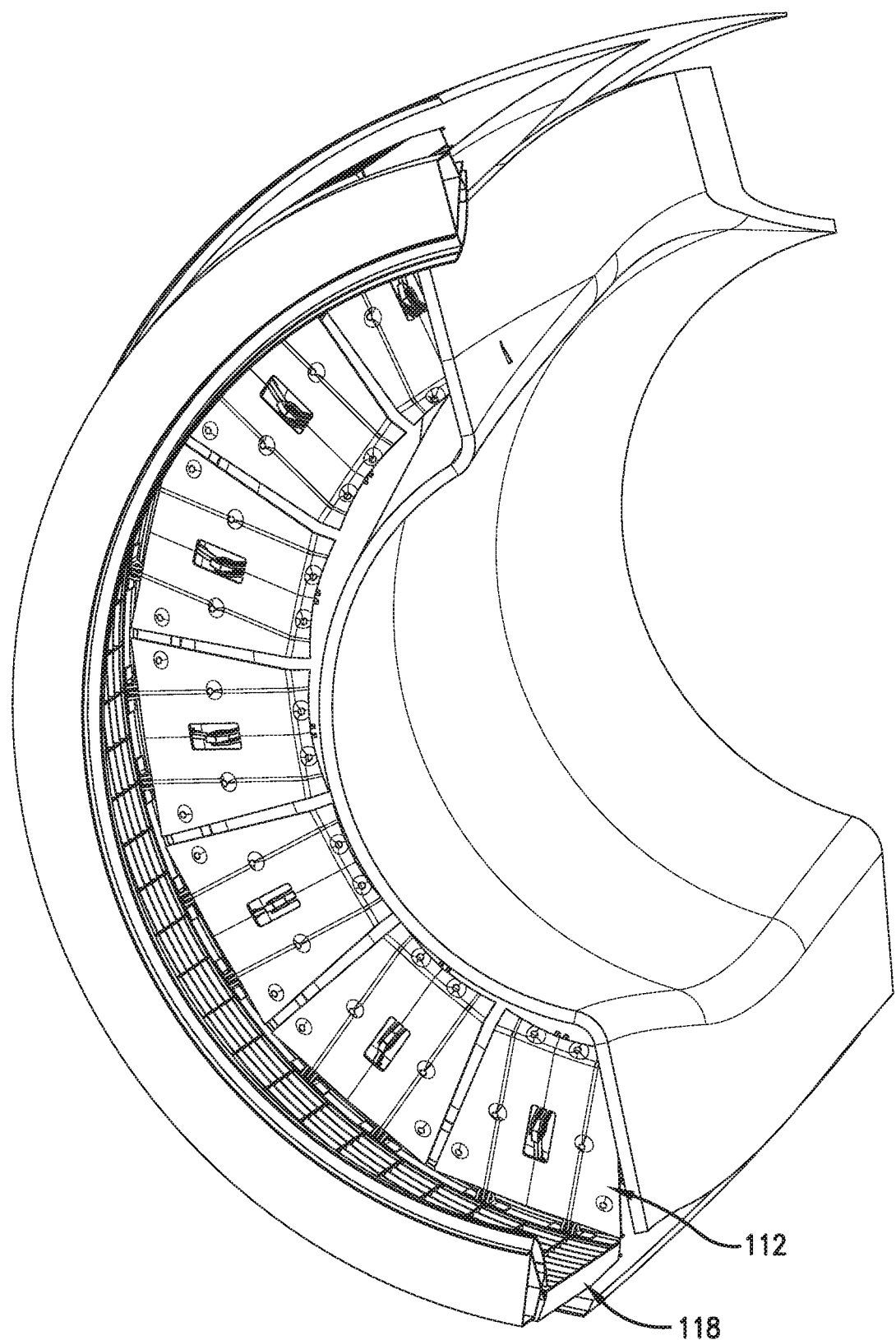

FIG. 25 is a fragmentary cross-sectional isometric view of a portion of the translating sleeve thrust reverser incorporating the system of FIG. 14, wherein the sleeve is shown in the stowed position and the blocker door is shown in the closed position; and FIG. 26 is a fragmentary cross-sectional isometric view of the portion of the translating sleeve thrust reverser of FIG. 25, wherein the sleeve is shown in the deployed position and the blocker door is shown in the open position.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, embodiments provide a system including a hidden drag link assembly for actuating a blocker door of a translating sleeve thrust reverser, wherein the hidden drag link assembly stows within a space between the sleeve and the blocker door so as to be removed from the airflow through the engine and thereby reduce drag during flight. Additionally, the blocker door itself may be hidden within a cavity in the sleeve, which further reduces drag.

Broadly, as the sleeve translates aft, the blocker door remains in the closed state until the link has traveled the length of a track, which allows the door to open without interfering with the sleeve. At the end of the track, the link may engage a locking mechanism that prevents movement during deployment. The door may then rotate from the closed position to the open position, from which the door may redirect airflow through the cascade segments of the cascade assembly. In one implementation, a forward portion of the sleeve may include a deformable seal which allows the blocker door to deploy sooner, thereby further improving the transient behavior.

Embodiments advantageously remove, or "hide," the drag link assembly from the airflow through the engine. In commercial aircraft, this advantageously reduces drag of the internal duct flow, increases acoustic area, is compatible with an O-duct configuration, and reduces reverser thrust loads on the inner wall. In business aircraft, this advantageously allows for using a cascade-type thrust reverser which provides higher efficiency than a pivot door-type thrust reverser, and reduces drag of the internal duct flow by eliminating the pit which is required with a pivot door-type thrust reverser.

Referring to FIGS. 3-24, a system 110 is shown for actuating a blocker door 112 of a translating sleeve thrust reverser 114 having a translatable sleeve 116 and a cascade assembly 118. Broadly, the system 110 may include one or more blocker doors 112 and a drag link assembly 120 including a drag link track 122 and a drag link 124. In general, the sleeve 116 and the cascade assembly 118 may incorporate substantially any suitable conventional or non-conventional technologies for redirecting engine airflow relatively forwardly during deployment of the thrust reverser 114. In particular, the sleeve 116 may be translatable, or moveable, between a stowed position in which the cascade assembly 118 is covered and air flows through and rearwardly out of the engine to provide forward thrust, and a deployed position in which the cascade assembly 118 is uncovered and at least a portion of the air flowing through the engine is redirected through and forwardly by the cascade assembly 118 to provide reverse thrust.

The blocker door 112 may be configured to redirect the engine airflow through the cascade assembly 118. More particularly, the blocker door 112 may be actuatable between a closed position (seen in, e.g., FIGS. 3, 6, 14, and 17), which corresponds to the stowed configuration of the sleeve 116, and an open position (seen in, e.g., FIGS. 5, 8, 16, and 19), which corresponds to the deployed configuration of the sleeve 116, and in which the blocker door 112 redirects the engine airflow through the cascade assembly 118. In one implementation, the blocker door 112 may be rotatably mounted by a hinge 128 to an aft cascade ring 130, and rotatable about the hinge 128 between the open and closed positions. The design of the blocker door 112 may vary depending on the desires for or needs of particular applications, and therefore the blocker door 112 may have substantially any suitable shape and be constructed of substantially any suitable material or combination of materials.

The drag link assembly 120 may be generally located in a space, or cavity, between the stowed sleeve 116 and the closed blocker door 112. The drag link track 122 of the drag link assembly 120 may be fixedly mounted to the sleeve 116 (as seen in, e.g., FIGS. 3-8) or to the blocker door 112 (as seen in, e.g., FIGS. 14-19). The drag link track 122 may include a first track end 132, a second track end 134, and a generally elongated channel 136 extending between the first and second track ends 132,134. The drag link 124 may have a first link end 138 and a second link end 140. The first link end 138 may be rotatably connected to the blocker door 112 (as seen in, e.g., FIGS. 3-8) or to the sleeve 116 (as seen in, e.g., FIGS. 14-19). The second link end 140 may be slidably received in the elongated channel 136 of the drag link track 122 and slideable or otherwise moveable within the elongated channel 136 between the first track end 132, at which the blocker door 112 is in the closed position, and the second track end 134, at which the blocker door 112 is in the open position. The specific dimensions, shapes, mounting/connection positions, and/or other design considerations of the drag link track 122 and/or drag link 124 may vary depending on the desires for or needs of particular applications. For example, the shape of the drag link track 122 may be designed so that the blocker door 112 opens and/or closes more slowly or more quickly, as desired.

In a first example implementation, seen in FIGS. 3-12, the drag link track 122 may be mounted to the sleeve 116 and the drag link 124 may be rotatably connected to the blocker door 112, and the elongated channel 136 may be generally straight between the first and second track ends 132,134. In a version of this implementation, the elongated channel 136 proximate to the second track end 134 may be provided with a simple or complex curvature configured to improve the load path and reduce slippage. In one implementation, the first and/or second link ends 138,140 may include a friction-reducing element (e.g., a wheel or roller bearing) configured to reduce wear and the risk of binding during movement.

In a second example implementation, seen in FIGS. 14-23, the drag link track 122 may be mounted to the blocker door 112 and the drag link 124 may be rotatably connected to the sleeve 116, and the elongated channel 136 may include a "dogleg," i.e., the first and second track ends 132,134 may be offset and connected by a laterally extending intermediate section of the elongated channel 136 to improve the load path and reduce slippage. As seen in FIGS. 17-19, a cavity or cut-out 142 may be provided in or through the blocker door 112 to accommodate the offset second track end 134. Further, as seen in FIG. 19, a notch may be provided in the cascade assembly 118 to provide clearance for the second track end 134. In one implementation, the first and/or second link ends 138,140 may include a friction-reducing element (e.g., a wheel or roller bearing) configured to reduce wear and the risk of binding during movement.

As seen in FIGS. 13 and 24, the system 110 may further include a locking element 146 located at the second track end 134 of the drag link track 122 and configured to securely engage and retain the second link end 140 of the drag link 124 when the blocker door 112 is in the open position. In one implementation, the locking element 146 may be a mechanical element which is rotatable between a receptive position, in which the second link end 140 is allowed to move into or away from the second track end 134, and a retentive position, in which the second link end 140 is not allowed to so move.

The system 110 may further include a bumper element 148 extending between the sleeve 116 and the blocker door 112 to reduce a chatter of the blocker door 112 when the blocker door 112 is in the closed position. For example, as seen in FIGS. 3-12, the bumper element 148 may extend between the drag link track 122, which may be mounted to the sleeve 116, and the rotation point of the first link end 138 of the drag link 124. For another example, as seen in FIGS. 14-23, the bumper element 148 may extend between the drag link track 122, which may be mounted to blocker door 112, and the sleeve 116.

The system 110 may further include a seal element 152 provided on or near a leading edge of the sleeve 116. In one implementation, the seal element may be attached to the sleeve 116, while in another implementation, the seal element may be attached to the torque box or other adjacent structure. A pressure differential from the fan duct may assist the seal 152 to engage, and the seal 152 may be configured to be compressed by the blocker door 112 in the closed position, and thereby seal from the engine airflow the space between the sleeve 116 and the blocker door 112 in which the drag link assembly 120 is located. In the second example implementation, seen in FIGS. 14-23, the kinematics of the drag link 124 may bring it into physical conflict with the leading edge of the sleeve 116, in which case a split, groove, or other channel 154 may be provided in the seal 152, and the drag link 124 may pass into the channel 154 to avoid the physical conflict.

As seen in FIGS. 3-8 and 14-19, during deployment of the thrust reverser 114, actuators mounted to the torque box may translate the sleeve 116 rearward from the stowed to the deployed positions. As the sleeve 116 moves, the drag link track 122 or drag link 124 mounted to the sleeve 116 may move with it, and the second link end 140 of the drag link 124 may slide within the elongated channel 136 toward the second track end 134 of the drag link track 122. When the second link end 140 reaches the second track end 134, the locking mechanism 146 may engage and retain the second link end 140, and kinematics may cause the blocker door 112 to rotate about the hinge 128 and into the open position. During stowage of the thrust reverser 114, the actuators mounted to the torque box may translate the sleeve 116 forward from the deployed to the stowed positions. The locking mechanism 146 may disengage and release the second link end 140, and kinematics may cause the blocker door 112 to rotate about the hinge 128 toward the closed position. As the sleeve 116 moves, the drag link track 122 or drag link 124 mounted to the sleeve 116 may move with it, and the second link end 140 of the drag link 124 may slide within the elongated channel 136 toward the first track end 132 of the drag link track 122.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for actuating a blocker door of a thrust reverser, the system comprising:
    a sleeve translatable between a stowed position in which an engine airflow is directed rearwardly and a deployed position in which the engine airflow is redirected forwardly;
    a blocker door moveable between a closed position associated with the stowed position of the sleeve in which the engine airflow is directed rearwardly and an open position associated with the deployed position of the sleeve in which the engine airflow is redirected laterally by the blocker door;
    a drag link assembly located between the sleeve and the blocker door and configured to mechanically couple the sleeve to the blocker door so that translation of the sleeve to the deployed position moves the blocker door to the open position and translation of the sleeve to the stowed position moves the blocker door to the closed position, the drag link assembly including—
        a drag link track including a first track end, a second track end, and an elongated channel extending between the first and second track ends, and
        a drag link including a first link end and a second link end, with the second link end being slidably received in the elongated channel of the drag link track and moveable within the elongated channel between the first track end and the second track end,
    wherein during deployment of the thrust reverser, the sleeve is translated aft to the deployed position, and the second link end slides within the elongated channel toward the second track end which causes the blocker door to move to the open position, and
    wherein during stowage of the thrust reverser, the sleeve is translated forward to the stowed position, and the second link end of the drag link slides within the elongated channel toward the first track end which causes the blocker door to move to the closed position in which the drag link assembly is not exposed to the engine airflow; and
    a seal provided on a leading edge of the sleeve, wherein the seal is configured to seal a space in which the drag link assembly is located between the sleeve and the blocker door from the engine airflow when the sleeve is in the stowed position and the blocker door is in the closed position, and wherein the seal includes a channel through which a portion of the drag link assembly passes when the sleeve is in the deployed position and the blocker door is in the open position.

2. The system of claim 1, wherein—
    the drag link track is mounted to the sleeve such that the drag link track moves with the sleeve; and
    the drag link is rotatably connected to the blocker door.

3. The system of claim 1, wherein—
    the drag link track is mounted to the blocker door; and
    the drag link is rotatably connected to the sleeve such that the drag link moves with the sleeve.

4. The system of claim 1, wherein the elongated channel proximate to the second track end is curved.

5. The system of claim 1, wherein the first and second track ends are offset and connected by a laterally extending intermediate section of the elongated channel.

6. The system of claim 1, wherein at least one of the first and second link ends include a friction-reducing element.

7. The system of claim 1, further including a locking element located at the second track end of the elongated channel of the drag link track and configured to engage and retain the second link end when the blocker door is in the open position.

8. The system of claim 1, further including a bumper element extending between the sleeve and the blocker door when the sleeve is in the stowed position and the blocker door is in the closed position.

9. The system of claim 8, wherein the bumper element extends between at least one of the sleeve or the blocker door and the drag link assembly mounted to at least one of the sleeve or the blocker door.

10. A system for actuating a blocker door of a translating sleeve thrust reverser, the system comprising:
- a sleeve including a cascade of elements, the sleeve being translatable between a stowed position in which an engine airflow is directed rearwardly and a deployed position in which the engine airflow is redirected forwardly by the cascade of elements;
- a blocker door moveable between a closed position associated with the stowed position of the sleeve in which the engine airflow is directed rearwardly and an open position associated with the deployed position of the sleeve in which the engine airflow is redirected laterally by the blocker door toward the cascade of elements;
- a drag link assembly including—
  - a drag link track mounted to the sleeve such that the drag link track moves with the sleeve during translation of the sleeve, the drag link track including a first track end, a second track end, and an elongated channel extending between the first and second track ends,
  - a drag link including a first link end and a second link end, with the first link end being rotatably connected to the blocker door, and the second link end being slidably received in the elongated channel of the drag link track and moveable within the elongated channel between the first track end and the second track end,
- wherein during deployment of the translating sleeve thrust reverser, the sleeve is translated aft to the deployed position, and the drag link track mounted to the sleeve moves with the sleeve, such that the second link end slides within the elongated channel toward the second track end which causes the blocker door to move to the open position, and
- wherein during stowage of the translating sleeve thrust reverser, the sleeve is translated forward to the stowed position, and the drag link track mounted to the sleeve moves with the sleeve, such that the second link end of the drag link slides within the elongated channel toward the first track end which causes the blocker door to move to the closed position in which the drag link assembly is not exposed to the engine airflow; and
- a seal provided on a leading edge of the sleeve, wherein the seal is configured to seal a space in which the drag link assembly is located between the sleeve and the blocker door from the engine airflow when the sleeve is in the stowed position and the blocker door is in the closed position, and wherein the seal includes a channel through which a portion of the drag link assembly passes when the sleeve is in the deployed position and the blocker door is in the open position.

11. The system of claim 10, wherein the elongated channel proximate to the second track end is curved.

12. The system of claim 10, further including a locking element located at the second track end of the elongated channel of the drag link track and configured to engage and retain the second link end when the blocker door is in the open position.

13. The system of claim 10, further including a bumper element extending between at least one of the sleeve or the blocker door and the drag link assembly mounted to at least one of the sleeve or the blocker door.

14. A system for actuating a blocker door of a translating sleeve thrust reverser, the system comprising:
- a sleeve including a cascade of elements, the sleeve being translatable between a stowed position in which an engine airflow is directed rearwardly and a deployed position in which the engine airflow is redirected forwardly by the cascade of elements;
- a blocker door moveable between a closed position associated with the stowed position of the sleeve in which the engine airflow is directed rearwardly and an open position associated with the deployed position of the sleeve in which the engine airflow is redirected laterally by the blocker door toward the cascade of elements;
- a drag link assembly including—
  - a drag link track mounted to the blocker door, the drag link track including a first track end, a second track end, and an elongated channel extending between the first and second track ends, and
  - a drag link including a first link end and a second link end, with the first link end being rotatably connected to the sleeve such that the drag link moves with the sleeve during translation of the sleeve, and the second link end being slidably received in the elongated channel of the drag link track and moveable within the elongated channel between the first track end and the second track end,
- wherein during deployment of the translating sleeve thrust reverser, the sleeve is translated aft to the deployed position, and the drag link mounted to the sleeve moves with the sleeve, such that the second link end slides within the elongated channel toward the second track end which causes the blocker door to move to the open position, and
- wherein during stowage of the translating sleeve thrust reverser, the sleeve is translated forward to the stowed position, and the drag link mounted to the sleeve moves with the sleeve, such that the second link end of the drag link slides within the elongated channel toward the first track end which causes the blocker door to move to the closed position in which the drag link assembly is not exposed to the engine airflow; and
- a seal provided on a leading edge of the sleeve, wherein the seal is configured to seal a space in which the drag link assembly is located between the sleeve and the blocker door from the engine airflow when the sleeve is in the stowed position and the blocker door is in the closed position, and wherein the seal includes a channel through which a portion of the drag link assembly passes when the sleeve is in the deployed position and the blocker door is in the open position.

15. The system of claim 14, wherein the first and second track ends are offset and connected by a laterally extending intermediate section of the elongated channel.

16. The system of claim 14, further including a locking element located at the second track end of the elongated channel of the drag link track and configured to engage and retain the second link end when the blocker door is in the open position.

17. The system of claim 14, further including a bumper element extending between at least one of the sleeve or the blocker door and the drag link assembly mounted to at least one of the sleeve or the blocker door.

\* \* \* \* \*